United States Patent
Subramanian et al.

(10) Patent No.: US 8,208,377 B2
(45) Date of Patent: Jun. 26, 2012

(54) MAC-ADDRESS BASED VIRTUAL ROUTE AGGREGATION

(75) Inventors: Krishnamurthy Subramanian, Mountain View, CA (US); Shivi Fotedar, Cupertino, CA (US); Janardhnan Narasimhan, Chennai (IN)

(73) Assignee: Force10 Networks, Inc., San Jose, CA (US)

( * ) Notice: Subject to any disclaimer, the term of this patent is extended or adjusted under 35 U.S.C. 154(b) by 236 days.

(21) Appl. No.: 12/732,653

(22) Filed: Mar. 26, 2010

(65) Prior Publication Data

US 2011/0235545 A1    Sep. 29, 2011

Related U.S. Application Data

(60) Provisional application No. 61/211,249, filed on Mar. 26, 2009.

(51) Int. Cl.
*G01R 31/08* (2006.01)

(52) U.S. Cl. ........ 370/230; 370/392; 370/401; 370/466; 709/238

(58) Field of Classification Search .................. 370/218, 370/230, 351, 389, 392, 401, 466; 709/223, 709/238
See application file for complete search history.

(56) References Cited

U.S. PATENT DOCUMENTS

| 2003/0048804 | A1* | 3/2003 | Inouchi et al. ............... 370/466 |
| 2006/0262735 | A1* | 11/2006 | Guichard et al. ............ 370/254 |
| 2008/0062891 | A1* | 3/2008 | Van der Merwe et al. .... 370/254 |

* cited by examiner

*Primary Examiner* — Jung Park
(74) *Attorney, Agent, or Firm* — Haynes and Boone, LLP

(57) ABSTRACT

An autonomous system includes at least some packet network devices that are capable of operating in a virtual route aggregation environment and some packet network devices that are not capable of operating in a virtual route aggregation environment. The autonomous system includes at least one egress border router, at least one aggregation router and at least one intermediate router. The egress border router uses an interior border gateway protocol to distribute a label message to the other routers in the autonomous system, the label message including a next hop MAC address associated with either an external router or the egress border router. The egress border router and the intermediate router using information included in the label message to contrast layer 2 table entries and the aggregation router using information included in the label message to construct a layer 3 table entry. The aggregation router receives a packet with a virtual prefix that corresponds to a virtual prefix in a list of virtual prefixes stored by the aggregation router, and routes the packet over a virtual path corresponding to one of the virtual prefixes.

11 Claims, 6 Drawing Sheets

MAC-ADDRESS BASED VIRTUAL ROUTE AGGREGATION

CROSS REFERENCE TO RELATED APPLICATIONS

This application claims the benefit under 35 U.S.C. §119 (e) of U.S. Provisional Patent Application Ser. No. 61/211,249 entitled "MAC-address-based virtual route aggregation", filed Mar. 26, 2009, the entire contents of which is incorporated by reference.

BACKGROUND

1. Field of the Invention

The present disclosure relates generally to packet networks, and more particularly to the routing and switching of packets within such networks.

2. Description of Related Art

In a packet network, "nodes" or "routers" share network address information that allows each node or router to forward packets toward their respective destination networks. For networks defined using the Internet Protocol ("IP"), each node is provisioned with a network address that identifies the particular network the system is on, and with a system or host address that uniquely identifies the node. Destination endpoints are likewise identified by IP addresses. These IP addresses are shared among neighboring nodes to allow each router to build a "tree" with itself as the root node and next-hop paths from itself to every reachable network address. Internet Protocol network and host addresses are concatenated to form an IP address, with the network address forming the prefix of the IP address. Current implementations recognize a method of categorizing IP addresses known as Classless Inter-Domain Routing (CIDR), e.g., further described in Internet Engineering Task Force (IETF) Request for Comments (RFCs) 1518 and 1519, incorporated herein by reference. CIDR uses what is known as Variable-Length Subnet Masking (VLSM). VLSM allows the length of the network prefix in an IP address to have a variable length. A CIDR-compliant address is written as address/prefix bits, e.g., 192.168.0.0/16 specifies that the first 16 bits of 192.168.0.0 form a network address. When talking about prefix lengths in general, a network address is often short-handed as "/x", where "x" is the number of prefix bits. Thus a "/16 address" specifies that the first 16 bits of an IP address are significant.

CIDR allows multiple contiguous prefixes to be aggregated by a router. For instance, when a router R1 has route entries to networks 192.168.0.0/17 and 192.168.128.0/17, it may in some circumstances advertise a route to a network 192.168.0.0/16, which includes both subnetworks. This reduces the amount of routing information that must be sent to and tracked by router R1's neighbors, as the neighbors can replace two routes with one in their routing tables.

Routers use IP network addresses to forward routed traffic within a packet network "autonomous system" (AS) according to an interior routing (or gateway) protocol (an "IGP"). Generally, an AS comprises a set of routers that are commonly administered, communicate with each other using one or more common IGPs and routing metric sets, and communicate with routers outside of the AS using an inter-AS (or exterior) gateway protocol ("EGP"). Regardless of the internal AS architecture, the AS presents to the world outside the AS, through the EGP, a consistent picture of the destinations that are reachable through it. Some common routing protocols in use today include Open Shortest Path First (OSPF), Intermediate System to Intermediate System (IS-IS), and Border Gateway Protocol (BGP). OSPF is further described in Internet Engineering Task Force (IETF) Request for Comments (RFC) 2328, "OSPF Version 2," by J. Moy, April 1998, and IETF RFC 2740, "OSPF for IPv6," R. Coltun, December 1999, both of which are incorporated herein by reference. ISIS is further described in the International Organization for Standardization (ISO) document ISO 8473, "Intermediate System to Intermediate System Routing Information Exchange Protocol for Providing the Connectionless-mode Network Service," ISO/IEC10589:2002, 2 nd Ed., which is incorporated herein by reference. BGP is further described in IETF RFC 4271, "A Border Gateway Protocol 4 (BGP-4)," by Y. Rekhter et al., January 2006, and is incorporated herein by reference.

OSPF and IS-IS are both IGPs and are examples of link-state protocols. A "link" can be considered to be an interface or port on a router (although some such protocols can be used to distribute other information). The state of that link contains a description of the interface and what routers/networks are reachable through that link. In OSPF, a link-state database contains the IP address of the interface/device, the subnet mask and other information describing the network, a list of routers connected to that network, a cost of sending packets across that interface, etc.

OSPF routers use link-state advertisements (LSAs) to share information from their link-state databases with neighboring routers in the same autonomous system. Whenever an interface is brought up or a change in outing information known to the router occurs, the router generates a LSA to inform its neighbors of the new or changed link-state information. When a neighbor router receives the LSA, it updates its own link-state database and then propagates the information in another LSA to its other neighbors. Thus the LSA is flooded to all routers, and all routers in the same area contain the same link-state database.

In order to place limits on the flooding of LSAs, OSPF allows routers in the same autonomous system to be grouped into areas. For instance, FIG. 1 depicts an autonomous system (AS) 100 divided into four areas A0, A1, A2, and A3. Every OSPF AS must have an area 0 or backbone area. Generally, all other areas connect to the backbone area, although provisions exist for transit areas.

Routers are classified according to their position in the AS. An internal router has all of its interfaces in the same area. In area A0, routers R1 and R2 are internal routers. Likewise, routers R8, R13 and R14, and RIO and RI 1, respectively are classified as internal routers in areas A1, A2, and A3. The internal routers maintain link-state databases containing all routing information distributed in their area, and all such link-state databases should be identical.

An area border router (ABR) has interfaces in multiple areas of the AS. R3 has two interfaces in area A0, and three interfaces in area A1, and is thus an ABR. Likewise R5 has two interfaces in area A0, and three interfaces in area A2, making it an ABR as well. Router R4 also has two interfaces in area A0, and three interfaces in area A3, classifying it as an ABR. Each ABR maintains a routing database for each area in which it maintains an interface. Each ABR also distributes some routing information between adjacent areas, including, where appropriate, summaries of routes.

An autonomous system boundary router (ASBR) has at least one interface in an area of the AS and at least one interface to another AS or running another routing protocol. The ASBR redistributes information received from the foreign network/protocol within OSPF. In FIG. 1, routers R6, R7, R9, and R12 are ASBRs. Router R6, for instance, communicates with a router R16 outside of the AS using eBGP (exterior BGP)

The Border Gateway Protocol (BGP) is currently the primary EGP used to route packets between the large numbers of ASes that, collectively, make up the "Internet." BGP itself can function as either an interior gateway protocol or an exterior gateway protocol. When used as an EGP, BGP ("BGPe") peers are located in different ASes. Each peer advertises to the other the networks/subnetworks that it can reach. BGP is a "path vector protocol"—BGP updates contain information detailing the AS-to-AS path that routing updates take to reach a router. From this path information, a BGP router can compare distance vectors for different possible routes to a destination and select a preferred route for each destination.

Each BGP speaker maintains a Routing Information Base (RIB) containing BGP update information. Within the RIB, unprocessed routing information received from the BGP speaker's peers is stored as "Adjacent-RIBs-In" information. As the BGP speaker processes the formation, it creates "Local-RIB" information, indicating the preferred routes that the BGP speaker has actually selected to use. From among these selected Local-RIB routes, the BGP speaker selects "Adjacent-RIBs-Out" information to be advertised to each specific peer. When two BGP speakers are first peered, each sends the other, through a set of updates, the entire appropriate contents of the Adjacent-RIBsOut database. Afterwards, incremental updates are used to inform the peer of new, changed, or withdrawn routes. Periodic KeepAlive messages exchanged by the peers insure each that the BGP connection is alive. Should the connection be closed for any reason by a BGP speaker, the speaker should send a Notification message, supplying a reason the connection is being closed, to the peer. When the BGP connection is closed, all routes that each peer has advertised to the other are removed from the RIB.

Although routing algorithms used by OSPF, IS-IS, and BGP provide one method to direct traffic across a packet network, other methods exist. For instance, protocols such as Multi-Protocol Label Switching (MPLS) allow packets to be routed across a packet network using small "labels" or "tags" inserted in the packets. Neighboring routers agree beforehand that packets transmitted from an upstream router to a downstream router with a given label will be forwarded along a unidirectional "label-switched path" (LSP). A LSP is essentially a tunnel set up between two "label edge routers" (LERs), one of which receives the packets and inserts the first label, and the other of which removes the last label and forwards the packet using other means (such as a traditional routing protocol). Other routers along the path are termed "label-switching routers" (LSRs), due to their function of switching incoming labels they recognize for outgoing labels that their downstream neighbor will recognize. Generally, the packets traversing a LSP belong to a common "Forwarding Equivalent Class" (FEC) that can be routed efficiently using the two LERs as points along the routing path.

FIG. 3 shows the same network diagram as FIG. 1, with three MPLS LSPs, MPLS1, MPLS2, and MPLS3 superimposed. Taking MPLS2 as exemplary, APR8 and R12 serve as label edge routers for the path. Routers R3, APR1, and R5 serve as label-switching routers for the path. Thus APR8 can send a packet to R12 by adding an MPLS label previously agreed upon by APR8 and R3, and forwarding the packet to R3. R3 recognizes the label as requiring that the packet be forwarded to APR1, with an MPLS label previously agreed upon by APR and R3. Two more similar hops deliver the packet to R12. R12 removes the MPLS label and forwards the traffic out an appropriate interface using, e.g., its stored routing information.

Interior and exterior gateway protocols, as well as label-switching protocols, ultimately direct packet flow through a router by installing routes in a Forwarding Information Base (FIB). FIBs are stored in some form of searchable memory that allows the router to quickly locate, for each received packet, an appropriate outgoing interface or interfaces, as well as packet-processing instructions.

As the used IP address space continues to grow, and also become more fragmented, each router in an AS is required to store an ever-increasing number of network routes in its FIB. Without some way to constrain the number of routes each router must know, the routers eventually reach a point where the physical memory available to store routes is exhausted.

A group of researchers associated with Cornell University has proposed a technique known as "Virtual Aggregation" that can be used to reduce FIB size for at least some routers in an AS. This technique is described in detail in "A White Paper on Reducing FIB Size through Virtual Aggregation," P. Francis et al., June 2008, which is incorporated herein by reference. Virtual aggregation allows a subset of routers in an AS to serve as aggregation points (APs) for a given "virtual" network address prefix that is not physically aggregable because the real constituent prefixes underlying the given prefix do not all exit the AS and/or area at the same point. Routers in the same area as an AP receive the APs advertisements of a virtual network address prefix. When a receiving router knows no better route for a given packet than one belonging to the virtual network address prefix, it forwards the packet to the AP. The AP then uses a prearranged MPLS tunnel to forward the packet to the correct AS exit point.

FIGS. 2 and 3 present a virtual aggregation example. In FIG. 2, one router in each area assumes the role of an AP for a virtual prefix 10.130.1/24—these routers are labeled "APRx" and are depicted with a dashed "virtual route" to virtual prefix 10.130.1/24. Each router advertises the virtual route to other routers in its area. Each virtual router learns all actual routes underlying the virtual router, e.g., with an iBGP overlay scheme that allows some routers to learn a particular eBGP external route while others do not receive or ignore the external route. Thus in FIG. 2, APR8 learns that the network 10.130.1.64/26 is reachable through R7 and R16, the network 10.130.1/26 is reachable through R9 and R17, and the network 10.130.1.128/25 is reachable through R12 and R18. R3, R6, and R7 need not learn how to reach these subnetworks—traffic for all three is simply forwarded to APR8, which has advertised the larger virtual network 10.130.1/24.

APR8 maintains three MPLS LSPs corresponding to the three real subnetworks underlying the virtual address 10.130.1/24. As shown in FIG. 3, MPLS1 connects APR8 to R7, MPLS2 connects APR8 to R12, and MPLS3 connects APR8 to R9. Three FIB entries relate each real subnetwork to one of the three MPLS LSPs. When APR8 receives traffic having an address falling within the advertised virtual network, it matches the traffic with a FIB entry for the real subnetwork. The FIB entry instructs APR8 to MPLS-encapsulate a packet with an appropriate label and place it on the preconfigured LSP that connects the AP router to the appropriate AS edge router (for instance, MPLS2 to R12 for traffic addressed to network 10.130.1.128/25). The AS edge router deencapsulates the packet and forwards it out of the AS.

Routing using virtual aggregation is generally less efficient than direct routing, as the APR for a given virtual prefix will often not lie on a direct route to the egress point. This problem can be somewhat mitigated, while adding redundancy, by provisioning two APRs in an area to advertise and handle traffic for the same virtual aggregation. Additional routing efficiency can be obtained by identifying "popular prefixes," e.g., those to which significant traffic is directed, and distributing direct IP routes for the popular prefixes to all routers in an area. For instance, if most of the traffic in the virtual prefix 10.130.1/24 was directed to the real prefix 10.130.1/26, all routers could be allowed to learn both the virtual prefix 10.130.1/24 and the real prefix 10.130.1/26. Direct routing would be used for the real prefix, and virtual routing for all other traffic within the virtual prefix.

DETAILED DESCRIPTION

Figure 1:
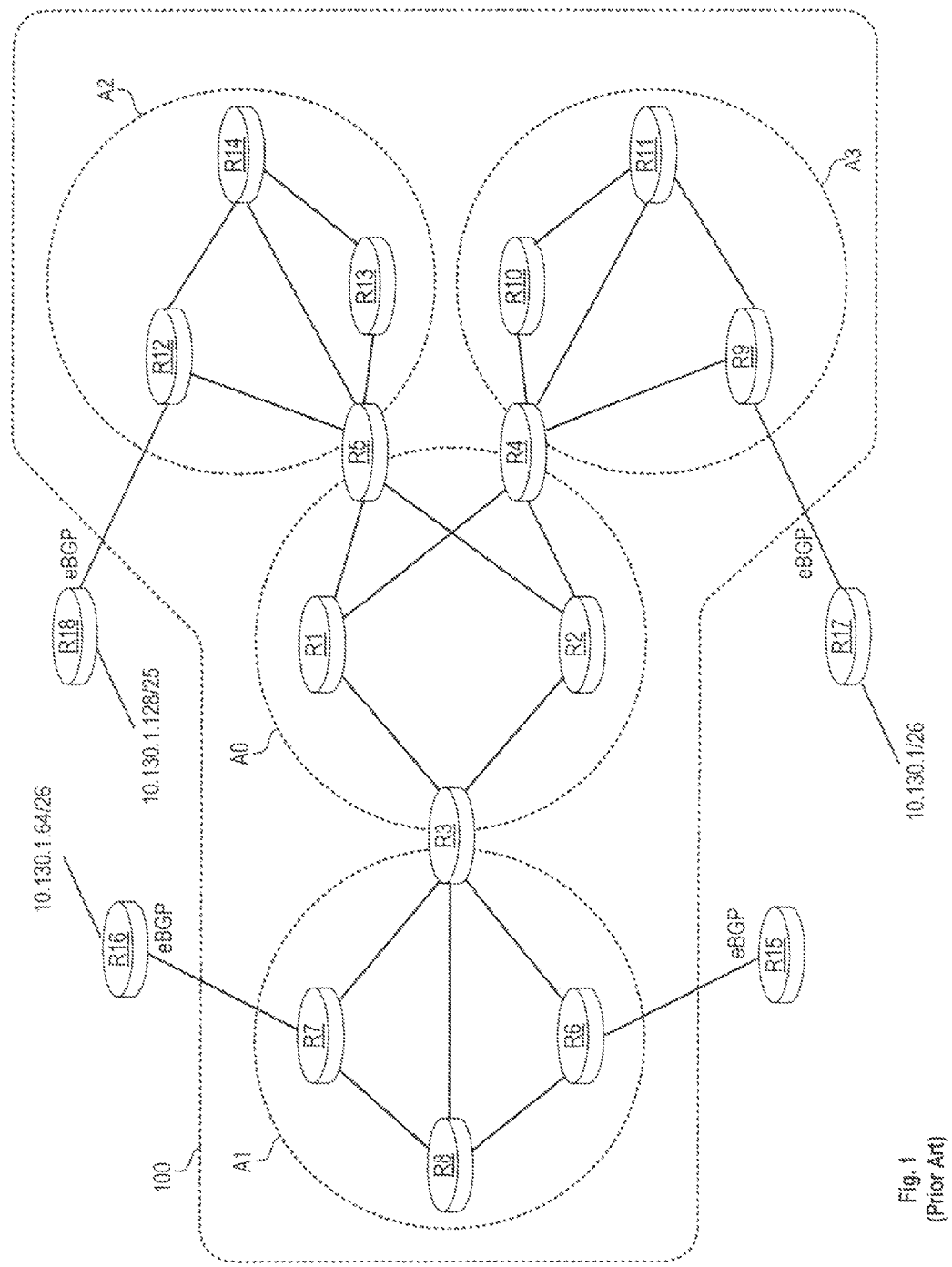
FIG. 1 shows an exemplary prior art network.
Figure 2:
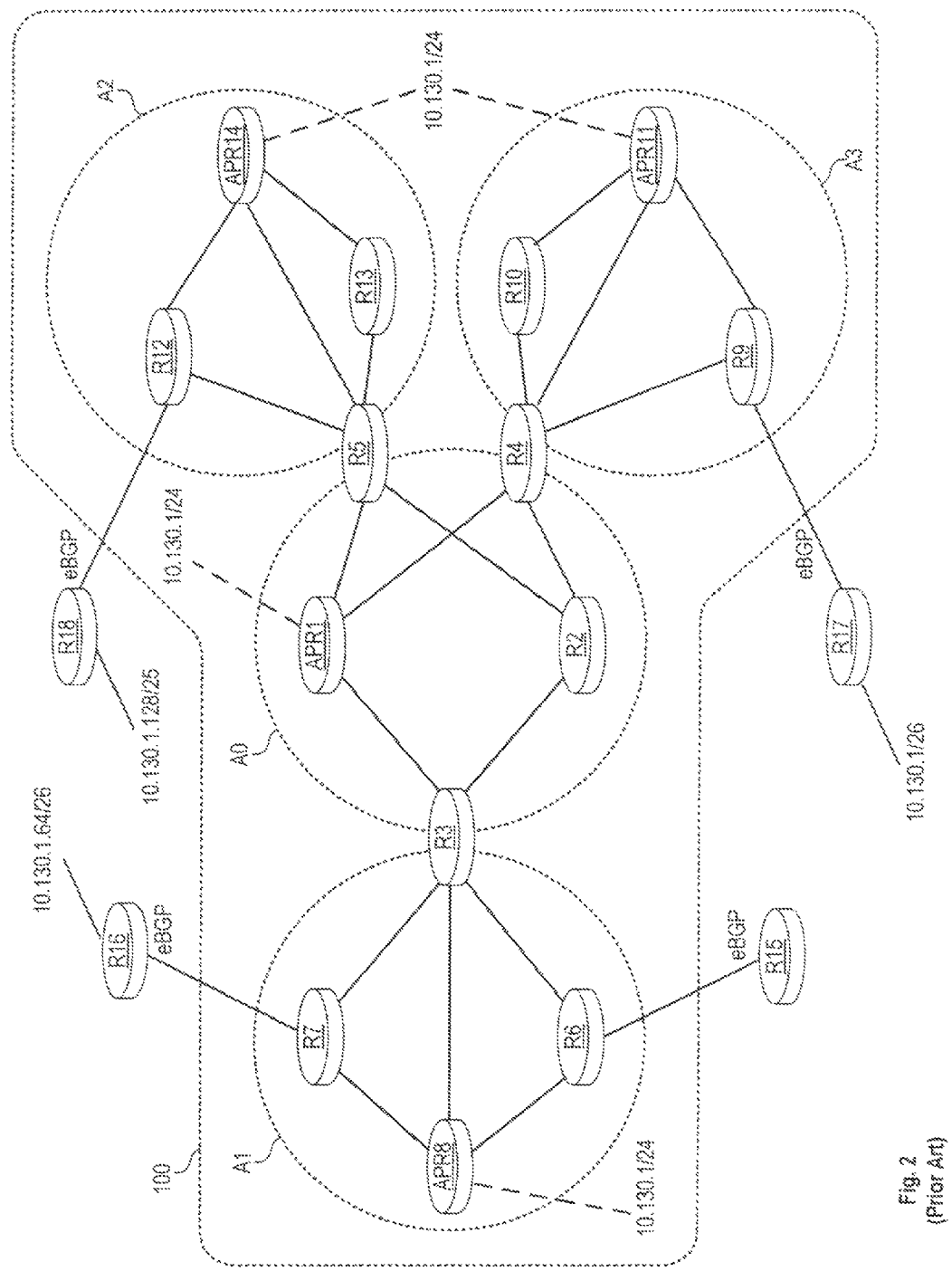
FIG. 2 shows the network of FIG. 1, with some routers designated as aggregation points for virtual aggregation.
Figure 3:
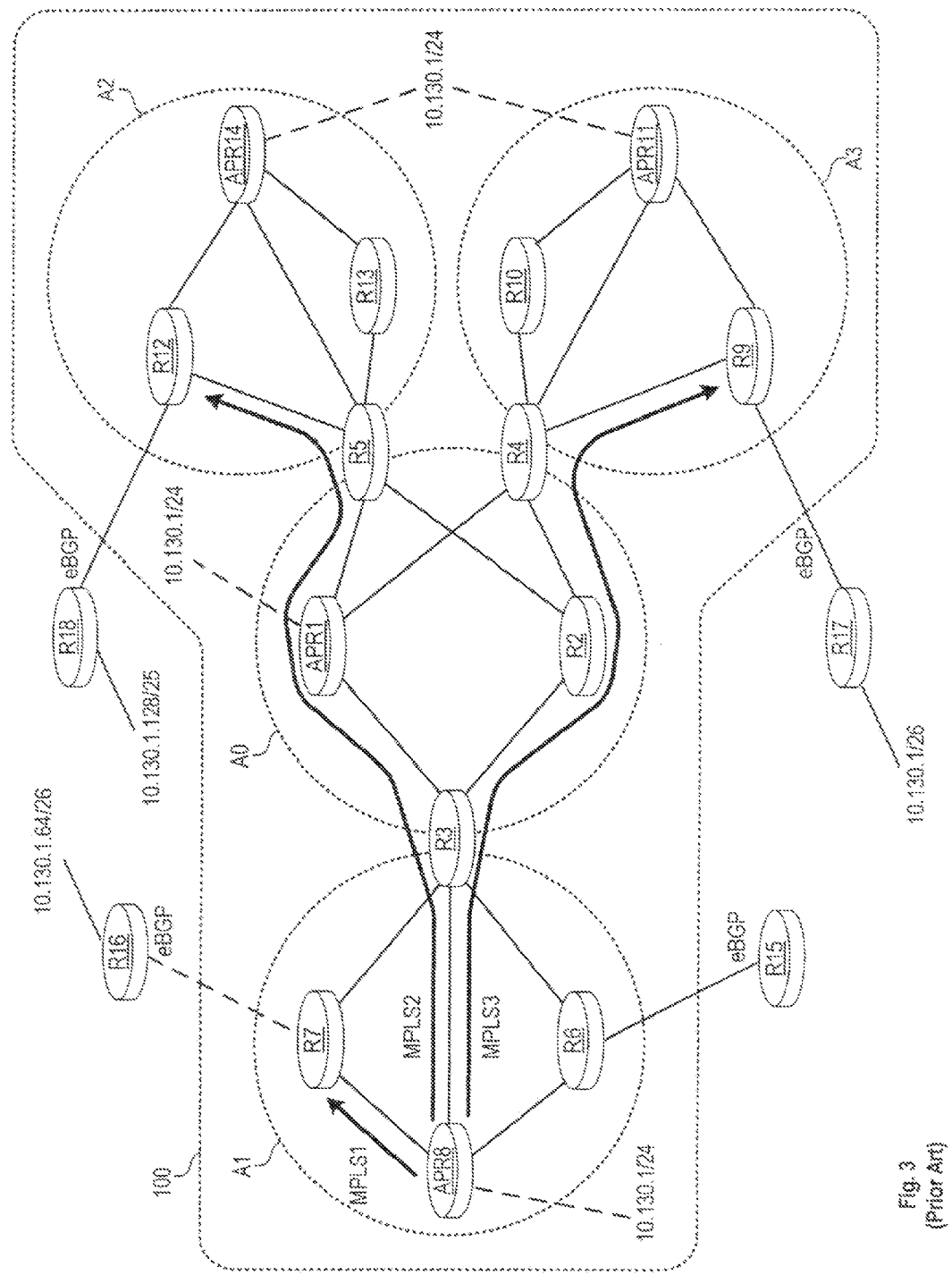
FIG. 3 shows the network of FIG. 2, with MPLS paths used to support the function of one of the aggregation point routers.

Although virtual aggregation can have real benefits in reducing router FIB size, it requires that most or all routers in an AS support Virtual Aggregation Points and MPLS or IP-in-IP encapsulation, which must also be supported by egress routers. When an AS contains routers that cannot participate in VA, a prior art VA implementation is even more complex, as it requires complex IGP routing overlays to ensure that complete routing information is known by all routers that require it.

The present disclosure includes methods to simplify and expand the applicability of VA implementations. In one embodiment including both VA-aware and VA-unaware ("legacy") routers, tunnels are used for all traffic traversing the network. The following tunnels are created, e.g., using MPLS. First, tunnels from all routers to all Aggregation Point Routers (APRs). Second, tunnels to all legacy routers that are border routers. Third, tunnels from all routers to all external peers that are neighbors of VA border routers.

An administrator configures a VP list, and a list of the APR(s) for each VP, on each router. The behavioral response of each router to these lists is determined by the router role for each particular VP. A legacy router, however, does not participate in VA, and thus has the following behavior. The legacy router holds the complete FIB entry, as it must forward VP-included packets to the correct egress point without the assistance of the VA-aware routers. The legacy router also initiates LSPs to itself, e.g., by initiating downstream unsolicited tunnels to all of its IGP neighbors using its own full /32 address. When the legacy router forwards an external route over iBGP, it sets the BGP NEXT-HOP attribute to the router's address. The legacy router also distributes its address over the IGP. Thus configured, legacy routers that are border routers can receive egress traffic from other legacy routers and VA-aware routers over the established tunnels, and forward the traffic appropriately to the correct external peer. Legacy routers that are ingress routers determine the actual egress point for each packet that is within the VP list, either another legacy router, or an external peer of a VA-aware router. The legacy router places the packet on the appropriate tunnel to reach the egress point. Legacy routers also can participate as intermediate points in tunnels established by the VA-aware routers.

In this embodiment, each router that is listed as an APR for one or more VPs in the VP list is configured as follows. That APR initiates a downstream unsolicited LSP to itself for the IP address corresponding to its VP(s). The APR installs routes for each VP and for all the real sub-prefixes contained in that VP. The APR also originates a BGP route to each of its VPs, including Network Layer Reachability Information (NLRI) for each VP. The APR sets the ORIGIN to incomplete, includes the AS number of the APR's AS is used in the AS-PATH, and the BGP next hop is set to the APR's IP address. As VPs are not to be advertised outside of the AS, the APR also specifies the NO EXPORT community attribute. There is a possibility that a packet could be forwarded to the router whose best match is one of the APR's advertised VPs, but for which the APR has no matching real sub-prefix. In this case, the APR must drop such a packet.

The other routers in this embodiment are VA-aware, but are non-APR routers (or not the APR router for a particular VP). Each of these routers installs routes to VPs based on the configured VP list. Further, these routers install routes for each known prefix that is outside of the address space covered by the VP list. Finally, if a popular prefix list exists, these routers each install routes for the popular prefixes, even when they fall within the address space covered by the VP list. These routers participate in tunnel formation, and should use tunnels to reach next hops whenever a tunnel is available.

At least some routers will also be VA border routers. Each border routers should import the full /32 address(es) of their external peer(s) and propagate these addresses within the IGP. Each VA border router initiates an LSP with each internal neighbor in downstream unsolicited mode, for the external peer address(es). When a VA border router receives an external route, it forwards such routes over iBGP, with a next hop set to the external peer's address. The VA border router should then receive labeled packets, with the label corresponding to the LSP established for the external peer. The VA border router can strip the label and forward the packet directly to the external peer, with no FIB lookup required.

In some AS implementations, it may not be desirable and/or possible to construct MPLS or IP-in-IP tunnels to support Virtual Aggregation. Alternately, some MPLS tunnels may be possible, but others may not be possible in the same AS, due, e.g., to hardware limitations. The present disclosure includes embodiments that enable layer 2 (L2) switching of packets to augment or replace prior art LSP forwarding of VA traffic.

In one embodiment, the VA border router generates an iBGP advertisement and a L2-label message containing information necessary to "tunnel" a packet using layer 2 switching. The advertisement includes one or more IP prefixes that fall within a VP on the VP list, and are reachable through an external interface of the VA border router. The next-hop in the advertisement is set to the IP address of the external peer advertising the route(s) using eBGP. The label message contains, as a FEC (Forwarding Equivalence Class), the IP address of the external peer, and a MAC DA (Media Access Control Destination Address) that should be placed in the layer 2 header of packets using this tunnel. Generally, the MAC DA will come from one of two places—it is either the MAC DA of the external peer advertising the IP prefix, or it is a MAC DA of the VA border router. In some cases, a VLAN ID is also advertised, and that VLAN ID will become part of the tunnel information.

In the first MAC DA advertisement method, the VA border router distributes the MAC DA of the external peer advertising a route to a VP-included real sub-prefix. The VA border router advertises the VP-included routes into iBGP with the next hop set to the IP address of the external router. The VA border router also distributes a label message with the FEC set as the external router's IP address, and the label to be used set to the MAC address of the external peer. Finally, the VA border router creates an entry in its local layer 2 (L2) table to switch packets, received from neighbors within the AS, to the external peer when the MAC DA for those packets is the advertised external peer's MAC DA. The VA border router need not store the VP-included real sub-prefixes that it advertises in its own FIB table, and can thus reduce its own FIB size even for sub-prefixes it receives from its external peers.

Other neighboring routers in the AS receive the label messages from the VA border router. The routers install a next hop in their L2 table for the MAC DA, with the egress port being the port on which the message was received. These routers then distribute the label message to their peers, allowing the L2 tunnel to be built throughout the AS. When the routers in the AS subsequently receive packets with the MAC DA, the packets are L2 switched towards the VA border router. Any intermediate routers do not need L3 FIB entries for the tunneled packets.

The APR installs a L3 FIB entry for the VP-included real sub-prefix advertised by the VA border router. The L3 FIB entry uses the details received in the L2-label message having the FEC that is the IP address of the external router. This entry points to an L2 header instruction for inserting the external router's MAC DA and any other needed information in the L2 header, and forwarding the packet out the appropriate egress port.

The APR can likewise use L2 tunneling messages to instruct VA-aware routers (and even legacy routers) in its area how to forward VP packets to the APR. The APR generates routes for the VP, setting the NO_EXPORT attribute and the next-hop to the APR's own IP address. The APR also generates a L2-label message with the FEC being its own IP address, and the label being a MAC address that the APR assigns for this purpose (the MAC address could be a globally unique MAC address useful for other purposes as well, or one unique to this service). The L2-label message is distributed like the similar message from the VA border routers. All non-APR edge routers install a route entry in their FIB, which is used whenever the VP is "hit". This single L3 FIB entry, acting as a surrogate for all real sub-prefixes falling within the VP, instructs a receiving edge router to construct an outgoing L2 header with the MAC DA supplied by the APR, and place the packet with that header on the egress interface to reach the APR. Any intermediate routers do not need L3 FIB entries for the tunneled packets.

Figure 4:
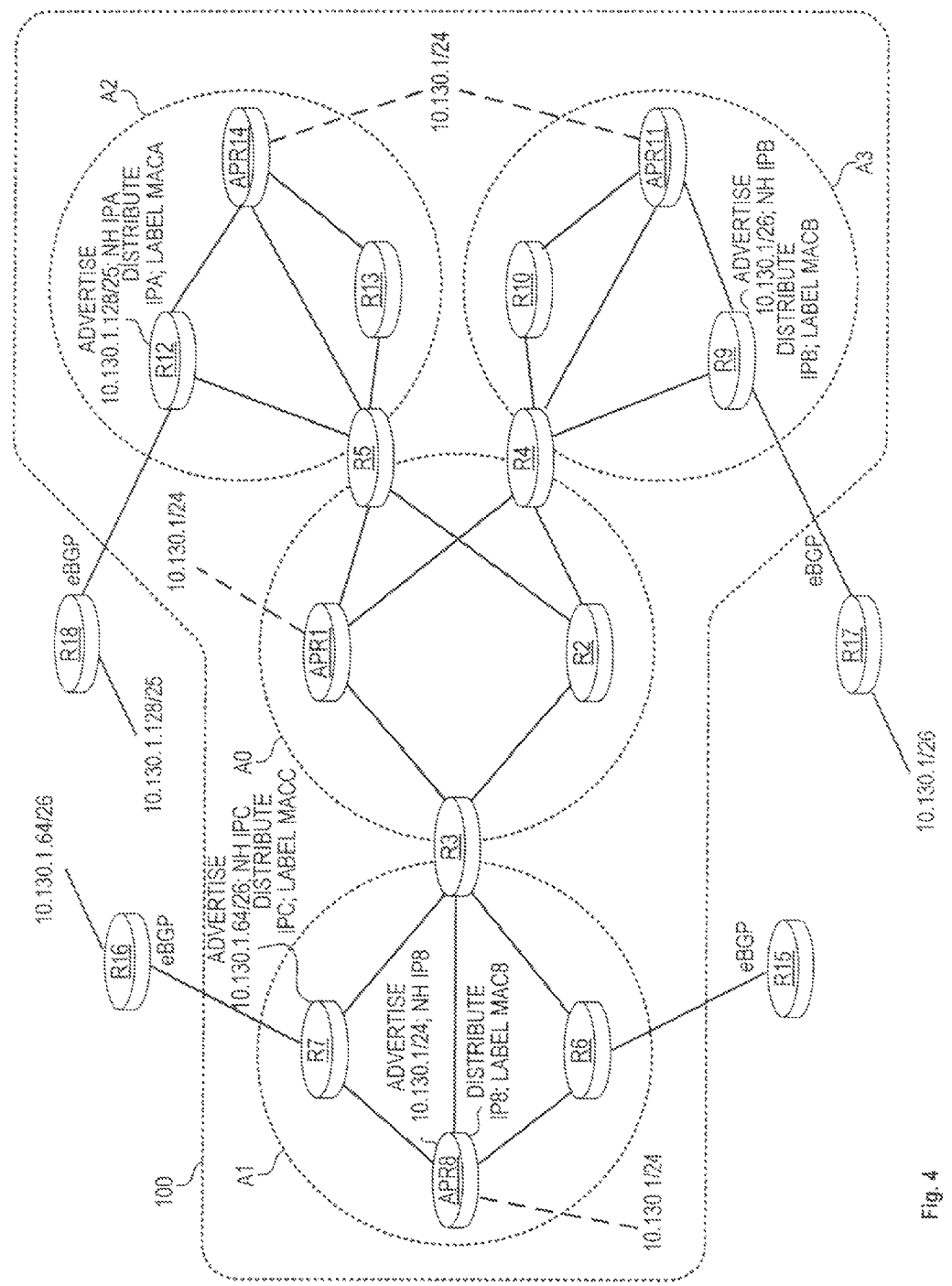
FIG. 4 shows a virtual aggregation network according to an embodiment using MAC-address-based switching for delivery of packets to a network egress point.

FIG. 4 shows a VA example using MAC DA-based tunneling. Like in the prior examples, the APRs in AS 100 aggregate 10.130.1.64/26 (advertised into the AS from R16), 10.130.1/26 (advertised into the AS from R17), and 10.130.1.18/25 (advertised into the AS from R18), into a virtual prefix 10.130.1/24. Each VA border router peered with one of these three external routers responds to the advertisement into the AS of a real prefix that is within the virtual prefix 10.130.1/24 by: a) advertising using iBGP the real prefix with a next hop of the external router's IP address; and b) distributing, via a label message, an association between the external router's IP address and the external router's MAC address. For instance, R12 advertises 10.130.1.128/25, with a next hop of IPA (R18's IP address), to its neighbors APR14 and R5 over iBGP. R5 does not create a FIB entry for this advertisement, because 10.130.1.128/25 is contained within the VP 10.130.1/24, but R5 does share the advertisement with its neighbors. APR14 does create a FIB entry for this advertisement, using the contents of a label message distributed by R12. The label message associates IPA with the MAC address of R18 (MACA). The FIB entry that APR14 creates allows APR14 to modify an incoming packet addressed to 10.130.1.128/25 by placing MAC in the L2 destination address. The packet is then forwarded to R12.

All routers respond to the IPA, MACA label message by creating a L2 FIB entry that will switch packets with the MAC DA MACA toward R12. The iBGP advertisements with the next hop IPA can assist a router in selecting the best switch path when the label message is received from different peers.

Routers R7 and R9 generate similar advertisements and labels for their external routes falling within the VP10.130.1/24. APR8 (and the other APRs for the VP) generate advertisements for the VP, with a next hop of their own IP address (in the case of APR8 the IP address is given the symbol IP8). The APRs also distribute a label message associating their IP address with a MAC address assigned to each (IP8, MAC8 for APR8).

Figure 5:
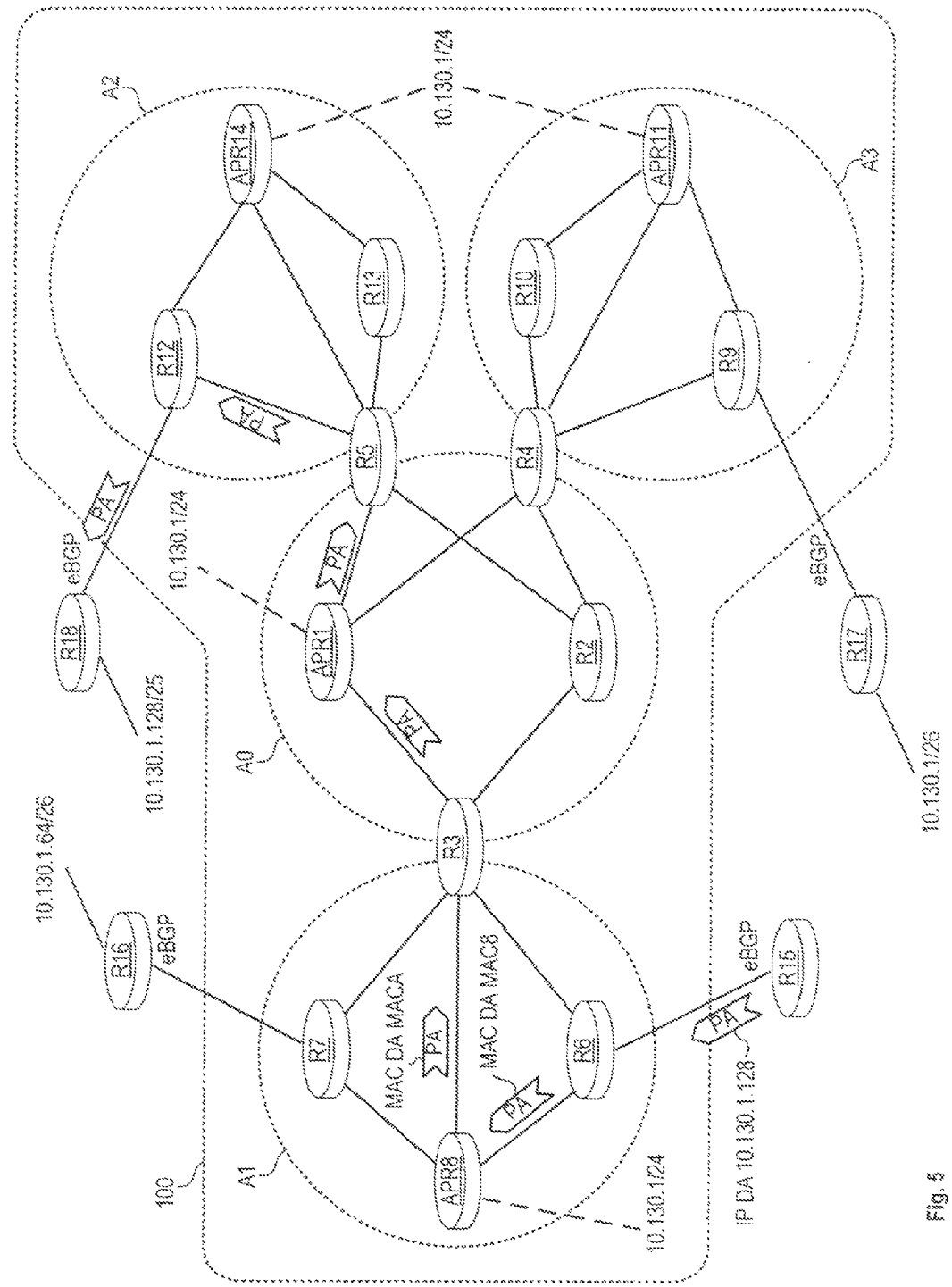
FIG. 5 illustrates handling for a packet passing through the network of FIG. 4.

FIG. 5 shows an example of a packet PA traversing AS 100 according to the paths set up for the VP 10.130.1/24. R15 forward the packet PA into AS 100 on a link to router R6. Packet PA has an IP DA 10.130.1.128/32, which is within the network prefix 10.130.1.128/25 reachable through R18. Router R6 does not have a route in its FIB for 10.130.1.128/25, but does have a route in its FIB for the VP 10.130.1/24. This FIB entry instructs R6 to construct an outgoing L2 header for PA with a MAC DA MAC8, and switch the packet out its interface to APR8.

APR8, upon receiving the packet, recognizes the MAC DA MAC8 as a local DA, strips the L2 header, and performs a L3 lookup on the IP DA. APR8, being an APR for the VP 10.130.1/24, has FIB entries for each of the real prefixes within 10.130.1/24. APR8 hits its entry for the real prefix 10.130.1.128/25, which indicates that R18 is the next hop. This FIB entry instructs APR8 to construct an outgoing L2 header for PA with a MAC DA MACA (the MAC address of R18 as seen by R12), and switch the packet out the interface designated as the label path to R12.

PA is then L2 switched along the path R3, APR1, R5, R12 to R18. At each step, the routers use the L2 entries created by the label message to switch the packet through to its destination.

In some networks, the AS may not be able to guarantee that the MAC addresses of the external peers are unique. With the previous L2 label messaging technique, this could cause difficulty if two conflicting external peers both advertise real prefixes within a virtual prefix. One way to avoid such a situation is to distribute, via the label messaging, a MAC address that is unique. In one embodiment, the VA border router uses a local DA as the MAC DA that is associated with the next hop IP address. The next hop IP address is set to the IP address of the VA border router, which will route the packet to the external peer. For instance, in FIG. 4, "MACA" is one of R12's MAC addresses instead of the R18 MAC address. MACA could be based on an OUI (Organizationally Unique Identifier) assigned to the router manufacturer, set aside by the AS administrator for L2 label messaging within the AS.

Operation of VA proceeds as in the previous embodiment, except for when a packet within a VP hits the VA border router. Referring back to FIG. 4, R12 creates a layer 3 FIB entry for 10.130.1.128. Since MACA is a local DA, the packet is routed using the L3 FIB entry to R18.

Figure 6:
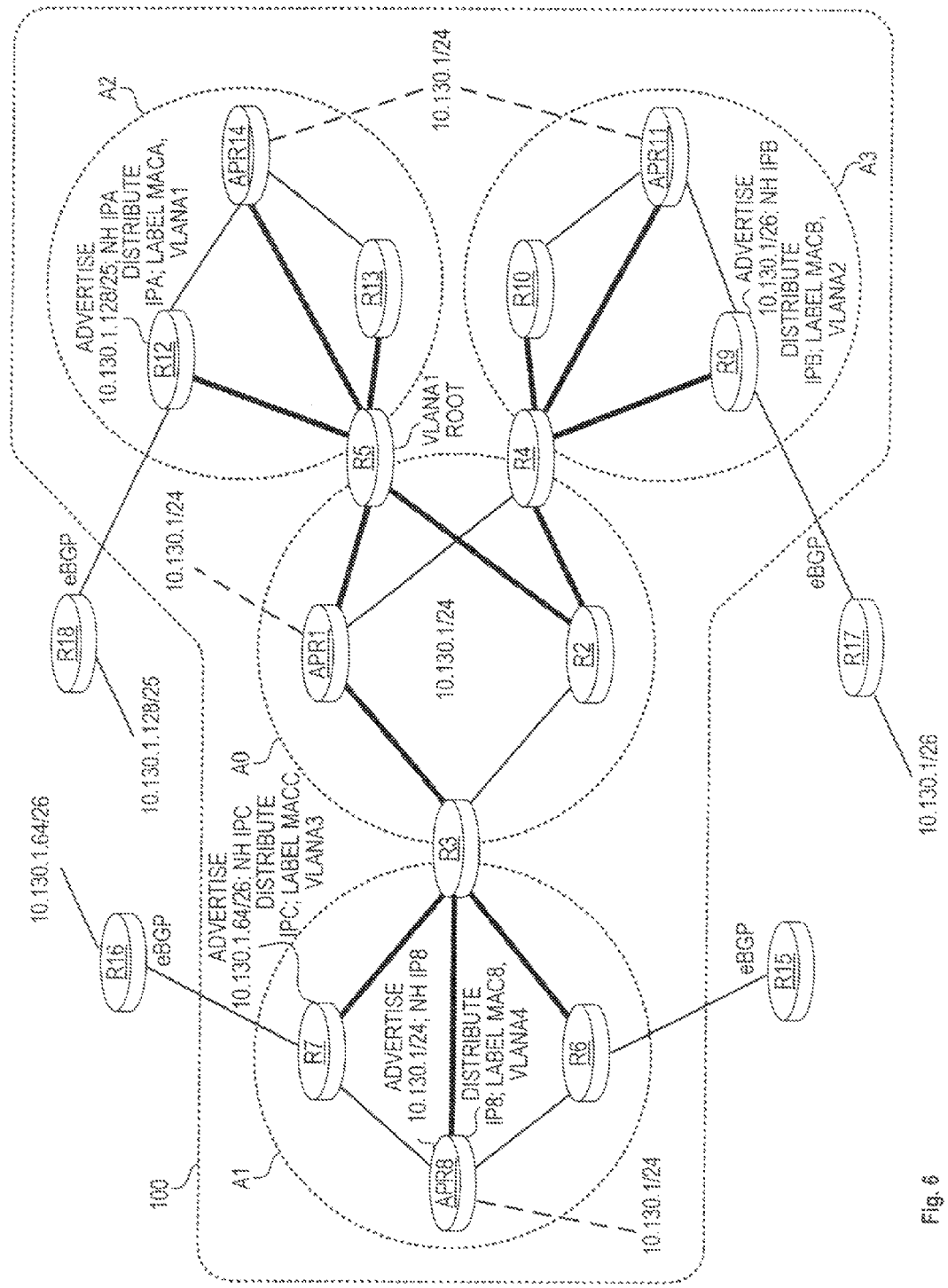
FIG. 6 shows a virtual aggregation network according to an embodiment using VLAN/MAC-address-based switching for delivery of packets to a network egress point.

FIG. 6 illustrates an alternate embodiment for avoiding conflicting MAC address problems. In FIG. 6, different VLANs are used for different border routers, with the VLAN ID distributed in the L2 label message. For example, R12 associates IPA and MACA with a VLAN VLANA1 set up by a root bridge R5 (bold lines show an exemplary spanning tree for VLANA10). R5 is an ABR connecting area A2 to the rest of AS 100. Thus no matter which APR switches "virtual" traffic bound for 10.130.1.128/25, it uses a VLAN tag with a VLAN ID of VLANA1, and the traffic is switched to R5, which then used MACA to forward the traffic to R12. R12 removes the VLAN tag and switches the traffic to R18.

Since a packet within a virtual prefix is switched across links between nodes that it would normally be routed between, the Time-To-Live (TTL) field in the packet's IP header is not decremented at the switching nodes. One approach is to treat the entire L2 tunnel as a single hop, having the APR decrement the TTL by 1. An alternate approach distributes hop count from the egress point during distribution of the L2-label message. Each node increments a hop count field in the label message before passing the label message upstream. Each APR notes the hop count in the label message in its L3 FIB entry, and decrements the TTL by this value prior to placing it on the L2 tunnel.

Although several embodiments and alternative implementations have been described, many other modifications and implementation techniques will be apparent to those skilled in the art upon reading this disclosure. Although a specific Border Gateway Protocol has been used to illustrate the embodiments, other protocols with similar characteristics have existed and will exist in the future. Thus usage of the generic term Border Gateway Protocol herein is intended to apply to BGP and other routing protocols with similar characteristics that would allow them to benefit from the techniques described herein. The label message distribution can be accomplished by a protocol similar to the existing Label Distribution Protocol, modified to meet the requirements of the embodiments. The embodiments show one exemplary configuration, but many other configurations are possible and workable with the VA as broadly described. Popular prefixes can exist and be accommodated by an embodiment. Further, some paths in an embodiment can be implemented with an MPLS tunnel, when the path elements support MPLS.

Although the specification may refer to "an", "one", "another", or "some" embodiment(s) in several locations, this does not necessarily mean that each such reference is to the same embodiment(s), or that the feature only applies to a single embodiment.

We claim:

1. A method for constructing one or more virtual path-included routes between an egress border router and a virtual aggregation router in a virtual route aggregation system comprising:
   the egress border router generating one or more messages that include information necessary to create a layer-2 tunnel for the one or more virtual path-included routes, wherein the one or more messages include:
      an advertisement message having one or more IP prefixes that fall within a virtual path on a virtual path list; and
      a label distribution message having an IP address of an external router that is external to the virtual route aggregation system and a MAC destination address of either the external router or the egress border router;
   creating an entry in a layer-2 table on the egress border router that is used to switch a packet, on the one or more virtual path-included routes, that includes layer-2 information corresponding to the entry; and
   using an interior gateway protocol to propagate the one or more messages to at least one virtual aggregation router which uses the information in the one or more messages to create a layer-3 table entry that is used to forward the packet over the one or more virtual path-included routes.

2. The method of claim 1 wherein the layer 2 table entry is the MAC destination address of either the external router or the egress border router.

3. The method of claim 1 where in the one or more virtual path-included routes are included in a list of virtual path-included routes.

4. The method of claim 1 wherein the interior gateway protocol is interior Border Gateway Protocol (iBGP).

5. The method of claim 1 wherein the at least one virtual aggregation router stores one or more virtual network prefixes.

6. A virtual path-included route in a virtual route aggregation system comprising:
   an egress border router, an aggregation router and at least one router intermediate the egress border router and the aggregation router;
   wherein the egress border router includes a layer 2 table entry comprising layer 2 information used to switch a packet on the virtual path-included route, the at least one intermediate router including a layer 2 table entry comprising information associated with the virtual path-included route, and the aggregation router including a layer 3 table entry that is used to forward a packet over the virtual path-included route if the packet includes information included in the layer 3 table entry that is associated with the virtual path-included route;
   wherein the egress border router is operable to generate one or more messages that include information necessary to create a layer-2 tunnel for the virtual path-included route, wherein the one or more messages include:
      an advertisement message having one or more IP prefixes that fall within a virtual path on a virtual path list; and
      a label distribution message having an IP address of an external router that is external to the virtual route aggregation system and a MAC destination address of either the external router or the egress border router.

7. The virtual path-included route of claim 6 wherein the layer 2 information is the MAC destination address of either the external router or the egress border router and the IP address of the external router.

8. The virtual path-included route of claim 6 wherein the egress border router has a direct link to another router that is external to the virtual route aggregation system.

9. The virtual path-included route of claim 6 wherein the at least one intermediate router is positioned in the virtual route aggregation system so that it is in the virtual path-included route between the egress border router and the aggregation router.

10. The virtual path-included route of claim 6 wherein the aggregation router stores one or more virtual network prefixes.

11. The virtual path-included route of claim 10 wherein the one or more virtual prefixes is comprised of two or more real network prefixes.

* * * * *